United States Patent [19]
Pan et al.

[11] Patent Number: 5,896,247
[45] Date of Patent: Apr. 20, 1999

[54] DISK FILE SUSPENSION FORMED FLEXURE

[75] Inventors: Tzong-Shii Pan; Victor Wing Chun Shum, both of San Jose, Calif.

[73] Assignee: International Business Machines Corporation, Armonk, N.Y.

[21] Appl. No.: 08/862,684

[22] Filed: May 23, 1997

[51] Int. Cl.⁶ .................................................. G11B 5/48
[52] U.S. Cl. ..................................................... 360/104
[58] Field of Search .................................. 360/103–106

[56] References Cited

U.S. PATENT DOCUMENTS

| | | | |
|---|---|---|---|
| 5,019,931 | 5/1991 | Ohwe et al. | 360/104 |
| 5,021,907 | 6/1991 | Zak | 360/104 |
| 5,353,181 | 10/1994 | Frater et al. | 360/104 |
| 5,473,488 | 12/1995 | Gustafson et al. | 360/104 |
| 5,519,552 | 5/1996 | Kohira et al. | 360/104 |
| 5,537,174 | 7/1996 | Imasaki | 360/104 |
| 5,739,982 | 4/1998 | Arya et al. | 360/104 |

FOREIGN PATENT DOCUMENTS

| | | |
|---|---|---|
| 2182260 | 7/1996 | Canada . |
| 737008A2 | 9/1996 | European Pat. Off. . |
| 8-129842 | 5/1996 | Japan . |
| 8336104 | 12/1996 | Japan . |
| 951501 | 1/1997 | Japan . |

*Primary Examiner*—Allen T. Cao
*Attorney, Agent, or Firm*—John H. Holcombe; Douglas R. Millett

[57] ABSTRACT

A gimbal suspension flexure is disclosed for supporting a slider for a disk drive. The flexure comprises a generally planar laminated flexure section having a dielectric layer and electrical leads disposed on a surface of the flexure section flexural steel layer, and a tongue extending from the flexure section at one end thereof, attached by three extension members, each extension member connecting a separate side of the tongue to the flexure section. The tongue is formed at the three extension members to be positioned in a second displaced from the plane of the flexure section. The tongue is formed so that the second plane is displaced a distance at least equal to the thickness of the dielectrical layer and the conductive layer, whereby the slider may be attached to the tongue displaced from the generally planar flexure section and positioned for electrical connection to the electrical leads, while maintaining the correct attitude for operation with the disk drive.

39 Claims, 6 Drawing Sheets

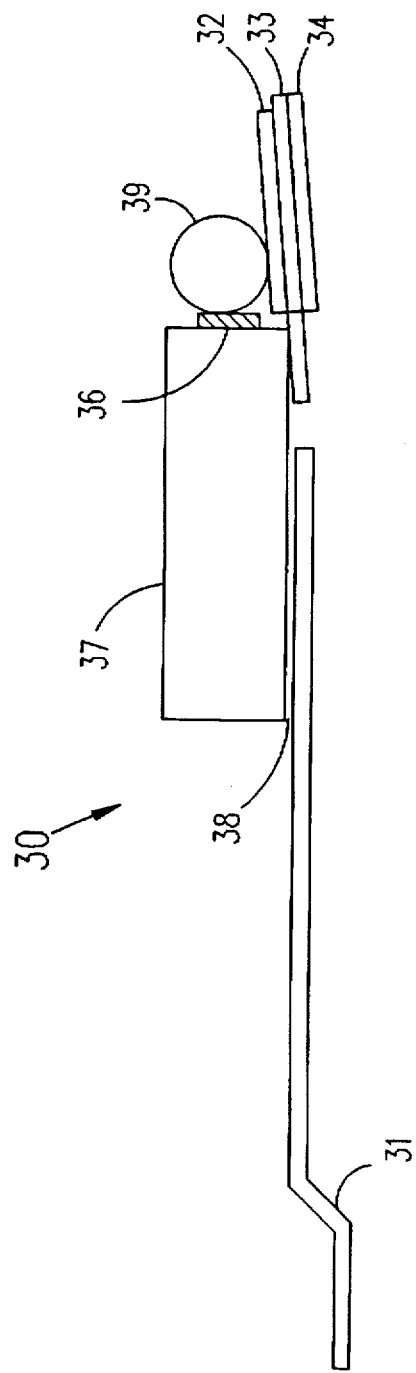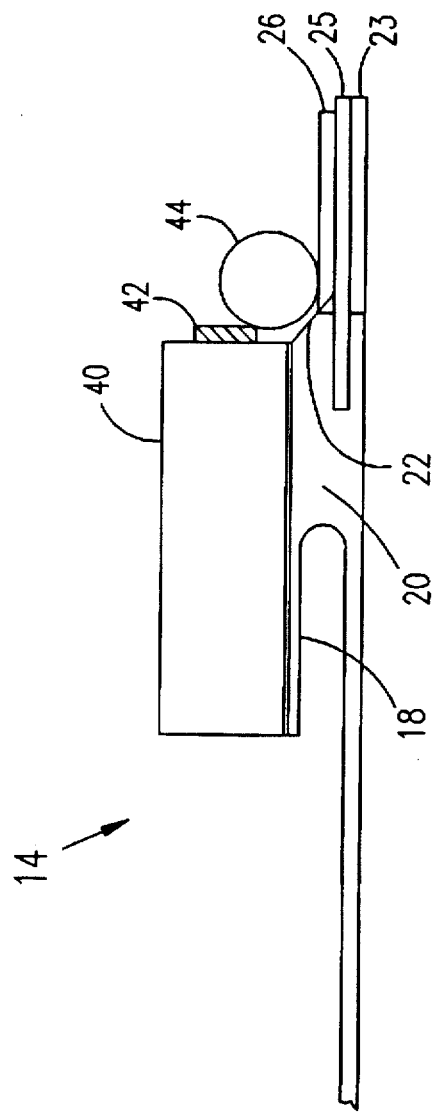

DISK FILE SUSPENSION FORMED FLEXURE

TECHNICAL FIELD

This invention relates to disk drive suspensions, and, more particularly, to a formed flexure for supporting a disk drive slider and the method for forming the flexure.

BACKGROUND OF THE INVENTION

Disk file suspension assemblies suspend a slider in close proximity to a moving disk in order that a transducer on the slider may read and/or write data on the disk. The function of the suspension assembly is to maintain the correct attitude of the slider for operation with the disk drive.

Disk drive suspension assemblies typically include, as component elements, a base plate or other mount platform, a load beam, a gimbal flexure and the slider. The load beam is an elongated metal spring structure The base plate is attached to a proximal end of the load beam, and is configured for mounting to an actuator arm of a disk drive. In some instances, the load beam is directly attached to the actuator arm The gimbal flexure is positioned on the distal end of the load beam The slider is mounted to the gimbal flexure and is supported thereby in read/write orientation with respect to an associated disk.

The suspension loads the slider into position against the disk, and the rotation of the disk creates an air stream which generates an air bearing between the disk and the slider, lifting the slider away from the surface of the disk. The resultant air bearing supports the slider nanometers away from the surface of the disk. The gimbal flexure provides gimballing support, that is, the gimbal flexure positions and maintains the slider at a desired air bearing "flying" attitude, a predetermined angle and height in relationship to the disk surface.

The static attitude of the slider, the position of the slider at rest with respect to the mount platform, is calibrated so that the slider can maintain an optimal flying height for the transducer thereon to read and/or write data onto the recording surface of the disk.

To counter the air lift pressure exerted on the slider during disk drive operation, a predetermined load is applied through a load point on the suspension to a precise load point on the slider. The slider flies above the disk at a height established by the equilibrium of the load on the load point and the lift force of the air bearing. The load of the suspension, together with the static attitudes, control and maintain the optimal flying height of the slider.

A conventional gimbal flexure, sometimes referred to as a Watrous gimballing flexure design, is formed from a single sheet of material and includes a pair of outer flexible legs about a central aperture and a cross piece extending across and connecting the legs. A flexure tongue is joined to the cross piece and extends from the cross piece into the aperture A free end of the tongue is centrally located between the flexible legs. The slider is mounted to the free end of the flexure tongue.

The free end of the flexure tongue positions the slider so that the load point of the slider is directly over the load point of the load beam The slider is then free to pivot about the load point as allowed by the gimbal structure. Any deviations caused by a lack of precision or distortion in forming or assembling the individual elements of a suspension contributes to a variation in static pitch and roll attitudes of the slider. The result of these static attitude variations is static pitch and roll torque which affect the desired flying height of the slider.

Static roll torque and static pitch torque have their rotational axes at about the center of the slider in perpendicular planar directions, and are caused by forces acting on the slider due to the air bearing surface not being parallel to the disk surface while the slider is flying over the disk. That is, static torque is the rotational force tending to rotate the slider out of parallelism with the disk surface while the slider is flying over the disk.

The ideal or desired pitch and roll attitudes are best defined as those which would not result in any pitch and roll torques when the suspension is installed in a disk drive. In an actual disk drive, pitch and roll static torques produce adverse forces between the air bearing surface of the slider and the disk, affecting the attitude of the slider and therefore the flying height of the slider above the disk, resulting in deviations from optimum read/write transducer/disk interface separation.

In the static attitude forming a conventional flexure design, the flexure legs and tongue are formed offset from a first section of the flexure toward the slider. The offset is formed where the flexure legs join the first section, or, in another example, where the flexure tongue and the cross piece join. The standard flexure design evidences a low value of pitch stiffness and moderate value of roll stiffness.

The flexure design is made so as to achieve a precise method of fabrication that accurately compensates and corrects for manufacturing variations that currently contribute to static pitch and roll torque errors. Since the roll torque axis is along the longitudinal axis of the flexure, roll torque errors are easily correctable.

The more difficult correction in the manufacturing process is the ability to perform corrections for pitch static attitude (PSA), since the corrections have to be made along the axis perpendicular to the longitudinal axis of the flexure. The ability to correct for the pitch static attitude is critical for proper flexure/slider/disk alignment in order to achieve a tight flight height tolerance. Any pitch misalignment of the slider will adversely affect the air bearing relationship of the slider to the disk and therefore adversely affect the flight height of the slider and transducer.

However, the PSA is changed during the assembly process. The first change is induced by dimple interference during the flexure and load beam assembly process. The dimple may be provided in the load beam and protrude from the load beam toward the flexure tongue, or the dimple may be provided in the flexure tongue and protrude from the tongue toward the load beam The dimple is normally made with a height at least equal to the flexure offset. Thus, when the load beam and the flexure are assembled, the dimple interference fit will force the tongue away from the load beam at an angle from the plane parallel to that of the load beam and of the first section of the flexure. The arm or base plate, load beam and flexure are then welded together and are likely to undergo another PSA change during this process.

For a laminated "integrated lead suspension assembly" (ILS), where the leads are formed by etching a conductor layer on a dielectric layer to form conductor traces, the PSA will change again during the head termination process which may comprise a bending of the leads into contact with a side of the slider for ultrasonic bonding to the transducer on the slider, may comprise solder or gold balls which are placed on the leads while supported by the dielectric and steel layers and heated to make contact between the leads and the transducer, or may comprise other methods.

The integrated lead suspension assembly has integrated copper traces acting as conductive wires. Although more predictable than the earlier individually assembled wires, the copper traces are stronger than the conventional wires. In the ultrasonic bonding example, these etched copper leads at the gimbal area are formed into a hook shape, which is called a bent lead, for use with the ultrasonic bonding process for slider/transducer termination. In reality, the distance from the bent lead to the corresponding slider termination pad has a relatively large tolerance Due to the strength of the bent lead, there will be a residual moment resulting from distortion of the flexure during termination which has to be balanced between the slider and bent lead platform after slider/transducer termination. This residual moment will drive the PSA change.

For the integrated lead suspension assembly using other termination approaches, such as solder or gold ball termination, the PSA change is caused by another mechanism. In this case, the flexure tongue and steel layer of the suspension will be in the same level before the slider/transducer is terminated to the trace conductors. The trace conductors will be etched back from the dielectric layer so that the dielectric will extend toward the slider beyond the edge of the conductor to prevent a potential short The dielectric layer will therefore be pushed down by the thickness distance of the dielectric under the slider during slider bond and the PSA will change. The magnitude of the PSA change depends on the coupling strength of the slider to the flexure tongue and the thickness of the dielectric.

The adjustment of the PSA is required in the manufacturing process to reduce the PSA to an acceptable range. The problem is that the adjustment at the conventional points of offset are so far removed from the slider that the PSA adjustable range is very limited. It is very difficult to adjust in a wide range. The other PSA adjustment through the load beam will affect the overall dynamic performance which is not preferred.

Thus, what is needed is a flexure assembly that may be precisely adjusted with a wide PSA adjustable range and insensitive to PSA change during slider bonding and transducer termination so as to achieve high quality and high yield.

SUMMARY OF THE INVENTION

A gimbal suspension flexure is disclosed for supporting a slider for a disk drive. The flexure comprises a generally planar laminated flexure section having a dielectric layer and electrical leads disposed on a surface of the flexure section flexural steel layer, and a tongue extending from the flexure section at one end thereof, attached by three extension members, each extension member connecting a separate side of the tongue to the flexure section. The tongue is formed at the three extension members to be positioned in a second plane displaced from the plane of the flexure section. The tongue is formed so that the second plane is displaced a distance at least equal to the thickness of the dielectric layer and the conductive layer, whereby the slider may be attached to the tongue displaced from the generally planar flexure section and positioned for electrical connection to the electrical leads, while maintaining the correct attitude of the slider for operation with the disk drive.

For a fuller understanding of the present invention, reference should be made to the following detailed description taken in conjunction with the accompanying drawings.

BRIEF DESCRIPTION OF THE DRAWINGS

FIG. 5 is a side view of a gimbal suspension assembly for solder reflow, or ball placement for the prior art termination;

FIG. 6 is a side view of a gimbal suspension assembly for solder reflow, or ball placement for termination in accordance with the present invention;

DETAILED DESCRIPTION OF THE INVENTION

Figure 1:
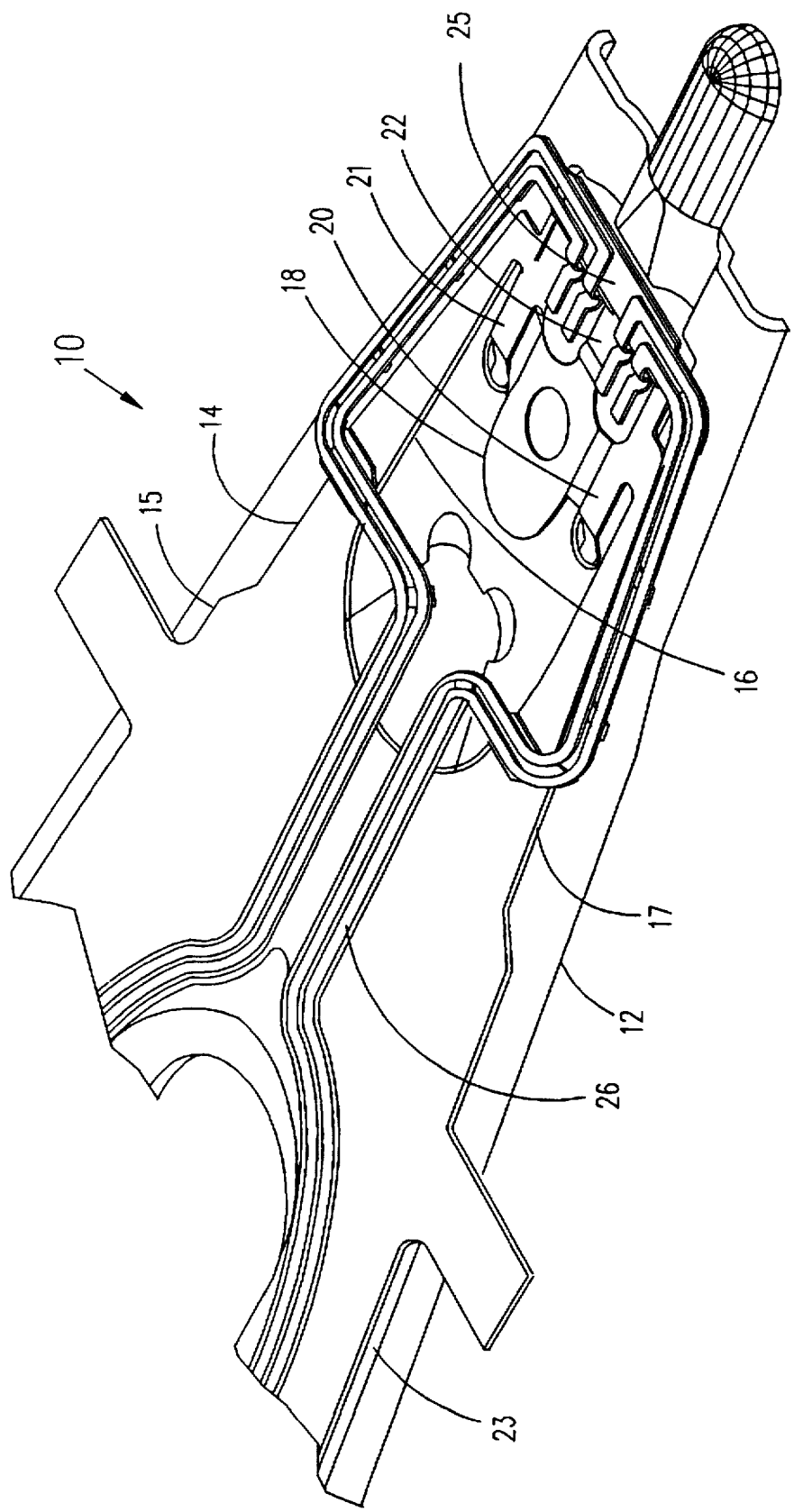
FIG. 1 is a perspective view of a gimbal suspension flexure of the present invention.

Referring to FIG. 1, a gimbal suspension assembly is shown which provides a flexure assembly that allows the PSA to be widely adjusted with reduced PSA sensitivity during slider bonding and transducer termination so as to achieve high quality and high yield.

The gimbal suspension assembly 10 comprises a load beam 12 to which is attached a flexure assembly 14. The flexure assembly is a generally planar elongated structure that is aligned with the load beam 12. A first section 15 of the flexure assembly is attached to the load beam Two legs 16 and 17 extend from the first section and are connected to tongue 18 at three extension members 20, 21 and 22. The flexure assembly comprises a firm support layer 23, such as steel, on which is laminated a dielectric layer 25 and a set of electrical conductor traces 26.

The dielectric layer may be of any suitable material, for example, a polyimide, and the conductor traces may also be of any suitable material, such as copper. Preferably, the dielectric layer and the conductor layer are laminated on the support layer 23, and are etched to form the dielectric layer and the conductor traces as shown.

Figure 2:
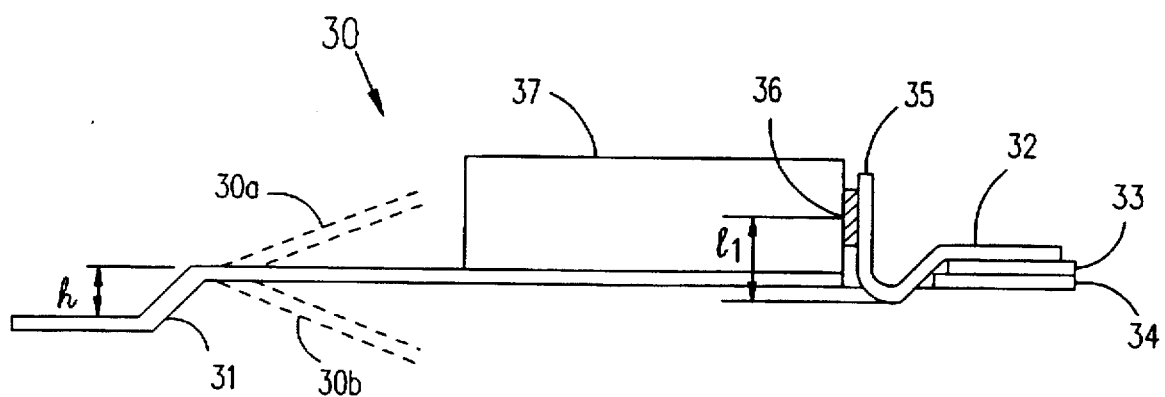
FIG. 2 is a side view of a gimbal suspension assembly and bent lead connection of the prior art.

Referring to FIG. 2, the prior art flexure assembly 30 is provided with an offset at the first section 31 of the flexure. For a laminated "integrated lead suspension assembly", where leads 32 are formed by etching a conductor layer to form conductor traces and the leads formed for the ultrasonic bonding example, the PSA will change during the head termination process, as described above.

The integrated lead suspension assembly has integrated copper traces 32 on a dielectric layer 33 which is supported on a support layer 34. In the ultrasonic bonding example, these etched copper leads at the gimbal area are formed into a hook shape 35, which is called a bent lead, to be able to use the ultrasonic bonding process for termination to transducer pad 36 on slider 37. In reality the distance between the bent lead and the corresponding slider termination pad has a relatively large tolerance. Due to the gap or interference between the lead and termination pad, there will be a residual moment which has to be balanced between the slider and platform after slider/transducer termination. The shorter free length $l_1$ lead transmits the higher-residual moment. This residual moment will drive the PSA change. To correct any PSA change, the offset h at point 31 of the first section, which is a considerable distance from the slider 37 must be adjusted as illustrated by phantom lines 30a and 30b to compensate for the PSA change Since the offset h is at the point where the legs come off of the first section, and is bent a long distance from the slider, it is relatively weak and imprecise, therefore making the PSA correction difficult.

Figure 3:
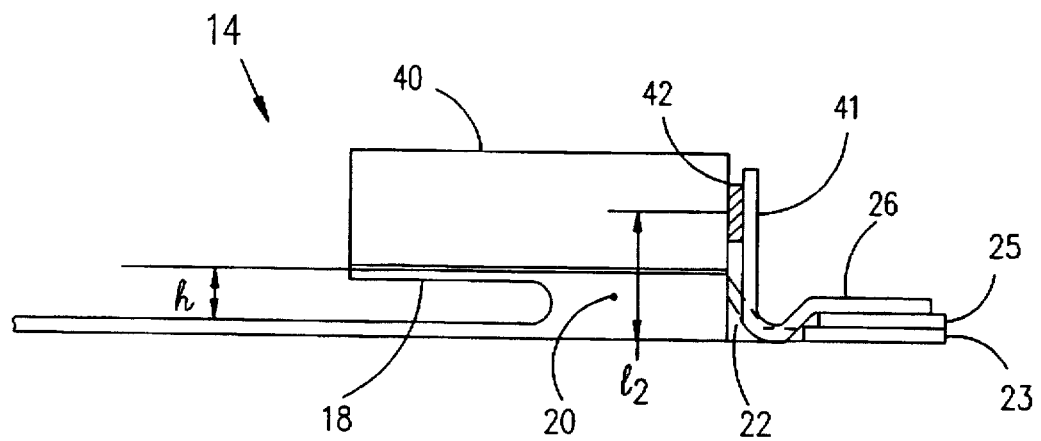
FIG. 3 is a side view of a gimbal suspension assembly and bent lead connection in accordance with the present invention.
Figure 4:
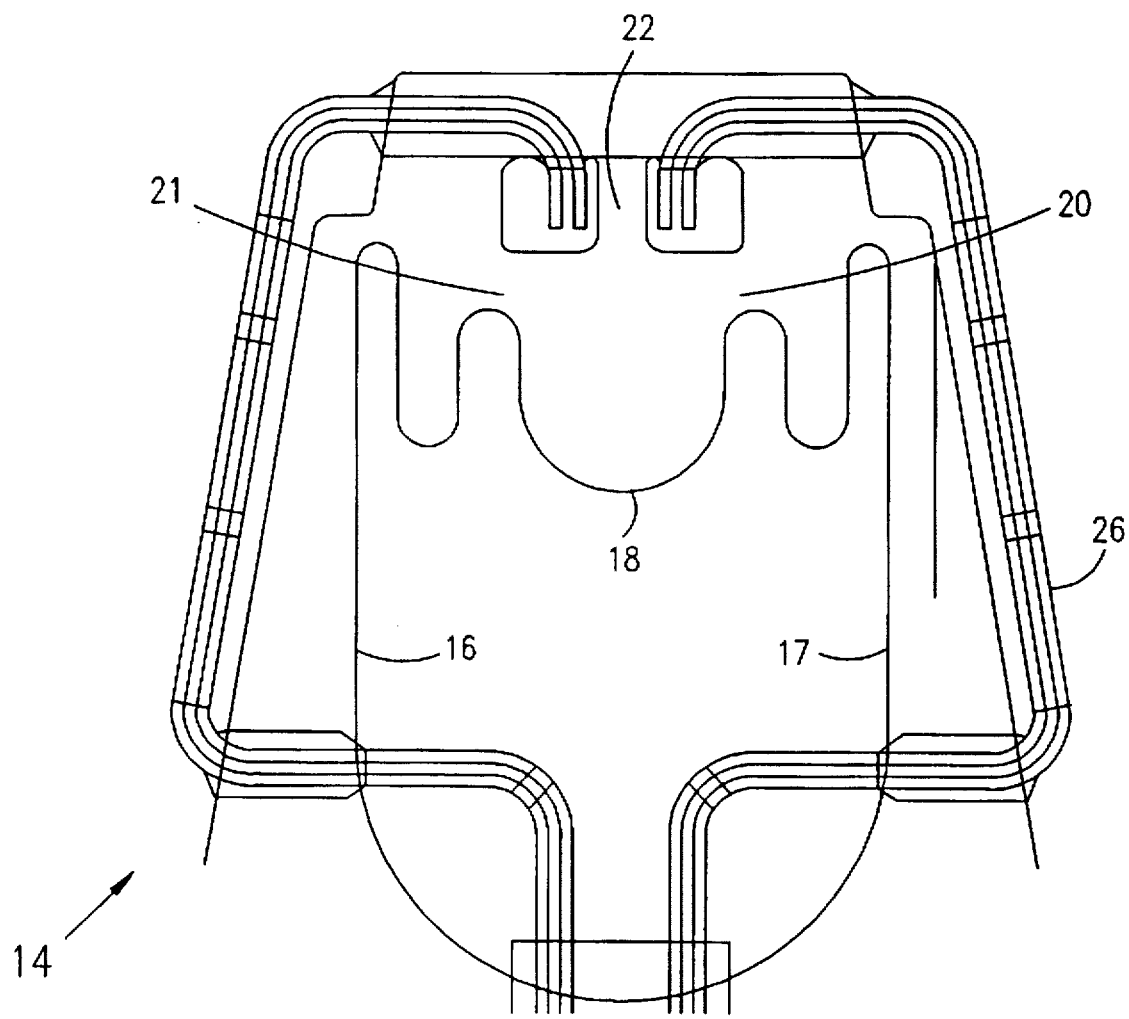
FIG. 4 is a plan view of the gimbal suspension assembly of FIG. 3.

Referring to FIGS. 3 and 4, the flexure assembly of the present invention in the ultrasonic bonding example, the flexure assembly 14 tongue 18 is raised by three point tongue forming at three extension members 20, 21 and 22. The three point forming raises the flexure tongue by a certain height h from the other parts of the flexure. This forming change both increases the sensitivity and range of the PSA adjustment due to a shorter distance to the pivot or dimple, and increases yaw stiffness and buckling strength of the flexure.

For the bent lead flexure, the lead bending stiffness is proportional to the inverse of approximately the cube of the free length. The lead bending strength will be reduced if the lead free length can be increased, and, hence, the PSA change will be reduced. The present invention raises the flexure tongue relative to other parts of the flexure such that the lead free length, $l_2$, from the platform to the termination pad, is increased. The longer lead also reduces the force generated by the lead termination, because a lead with a longer free length requires lower force or moment to bend during the termination process. Hence, the PSA change will be lower too.

Referring to FIG. 5, the prior art suspension assembly using other termination approaches, such as solder or gold ball termination, the PSA change is caused by another mechanism. In this case, the flexure tongue, on which the slider 37 is mounted by bonding 38, and the support layer 34 of the suspension will be in the same level before the bonding the slider. The trace conductors will be etched back from the dielectric layer 33 so that the dielectric will extend toward the slider beyond the edge of the conductor to prevent a potential short. The dielectric layer 33 is therefore pushed down by the thickness distance of the dielectric under the slider 37 during the slider bonding and solder or gold ball termination between the slider and traces, and the PSA is changed. The magnitude of the PSA change depends on the coupling strength of the slider to the tongue and the thickness of the dielectric.

Figure 7:
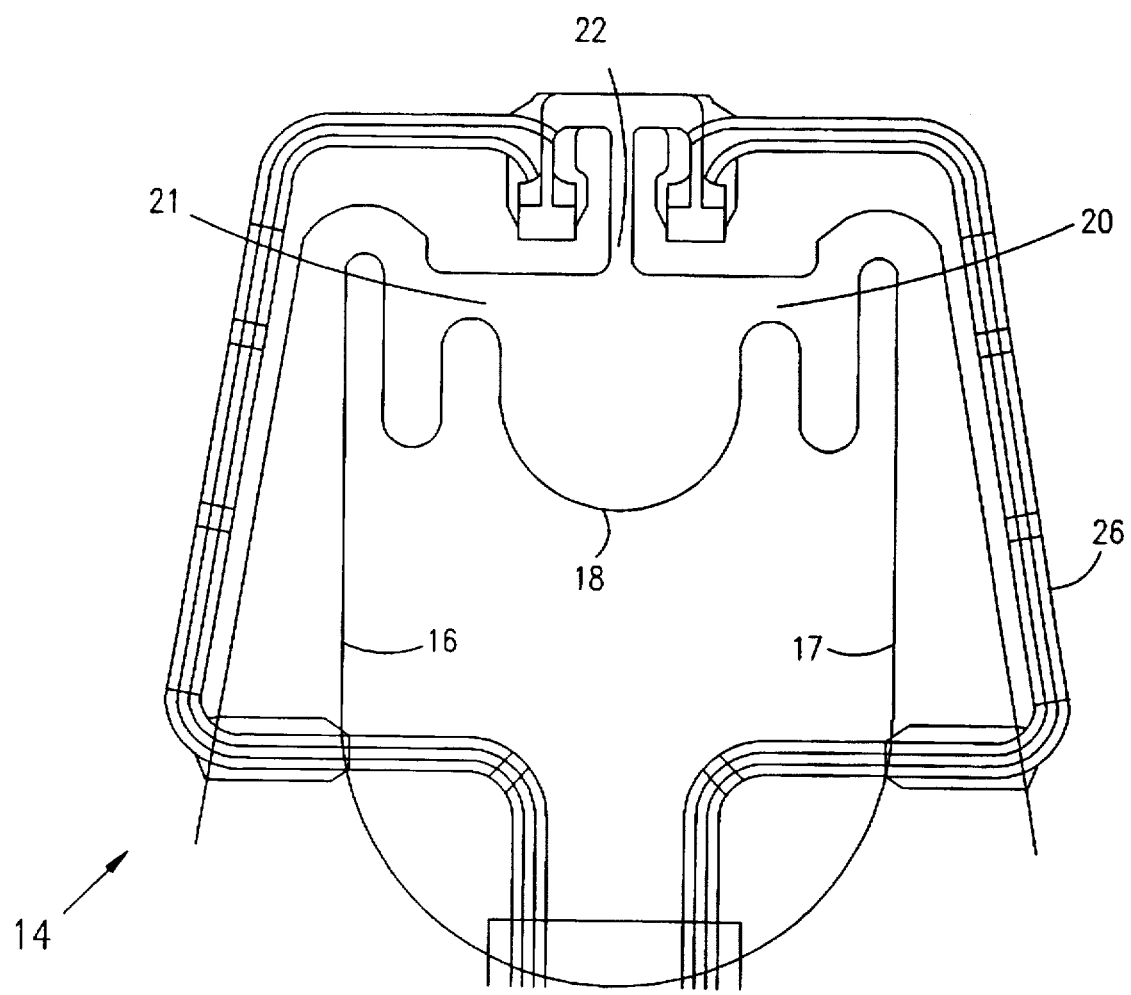
FIG. 7 is a plan view of the gimbal suspension assembly of FIG. 6.

Referring to FIGS. 6 and 7, the flexure assembly of the present invention in the solder or gold ball 44 bonding example, the flexure assembly 14 tongue 18 is raised by three point tongue forming at three extension members 20, 21 and 22. The three point forming raises the flexure tongue by a certain height h from the other parts of the flexure so that there will be no interference between the slider and the dielectric layer 25. Hence, the PSA change is eliminated in the slider bonding and head termination process. The solder or gold balls 44 bond the traces 26 to the transducer pads 42 while the support member 23 remains in position. Should the offset height be smaller than the thickness of the dielectric layer, the interference will still be lower than that in conventional forming and the PSA change will be smaller.

The method of forming is similar to that of the prior art and comprises adjusting each suspension separately. The flexure assembly is optically inspected and the flexure tongue height and angle formed with a conventional adjustment tool, and the slider mounted for bonding. The forming using the tongue forming of the invention at the three extension members 20, 21 and 22, however, both increases the sensitivity of the PSA adjustment due to a shorter distance to the pivot or dimple, and makes the slider bonding plane more consistent.

Specifically referring to FIGS. 1, 4, 5, 6 and 7, by forming the offset closer to the slider, the PSA adjustment is more sensitive and has a wider range. The formed space on the tongue 18 is now a precise space, providing a more precise location for mounting the slider 40. The three point forming increases the tangential stiffness as well as the tangential buckling strength. In tests, the stiffness is increased by about 10%. For the bent lead flexure, the lead free length is longer with the tongue forming and the bending strength is therefore reduced. Hence the PSA change due to lead termination is reduced. For the solder/gold ball reflow termination, the three point forming reduces or eliminates the PSA change. Lastly, should the slider bonding epoxy flow and be squeezed out during termination, the formed areas will serve as a reservoir therefore, preventing contamination, as opposed to overflowing the slider edge of the prior art.

Figure 8:
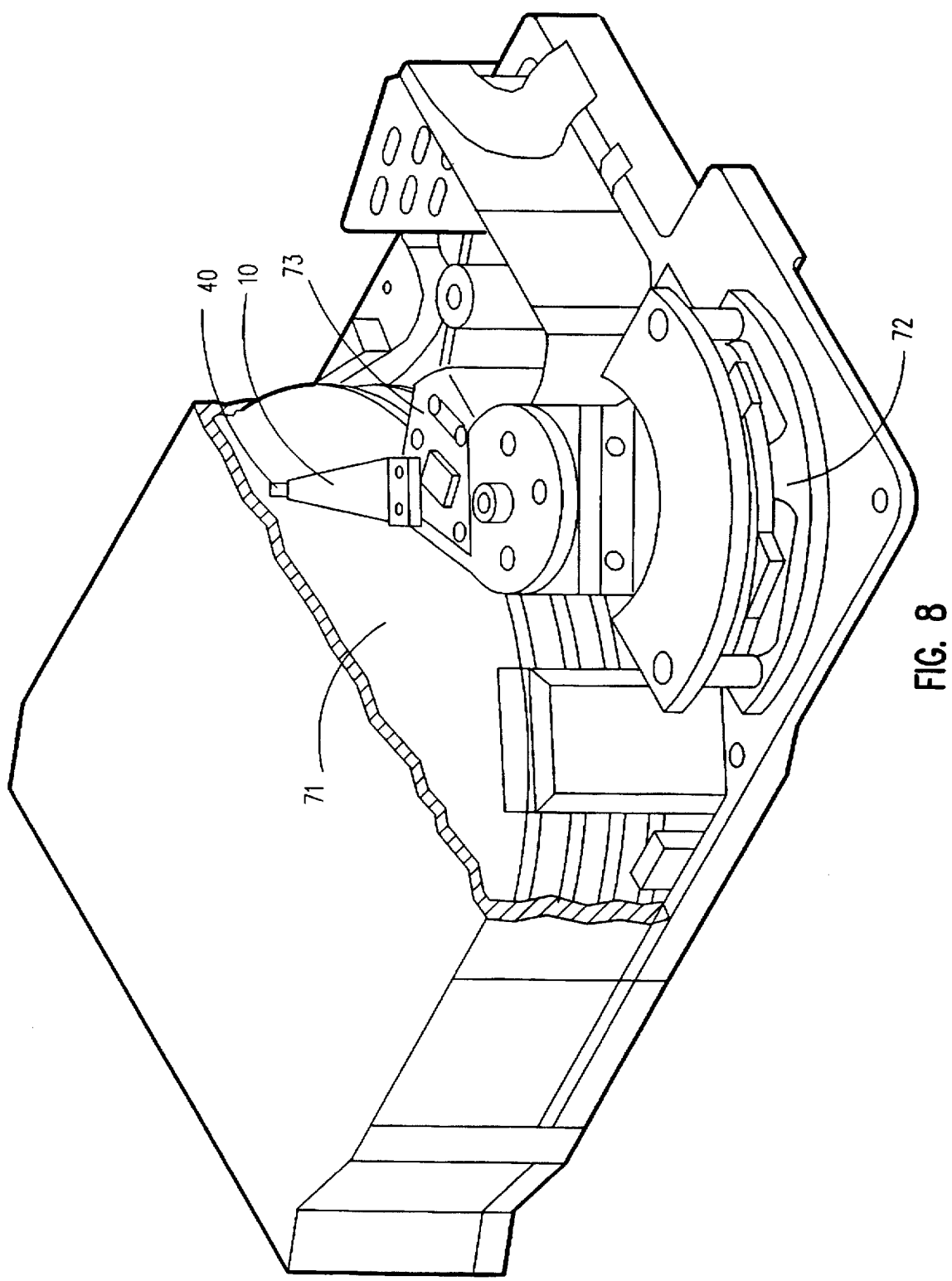
FIG. 8 is a perspective, partially cut away view of a disk file incorporating the gimbal suspension of the present invention.

FIG. 8 is a perspective, partially cut away view of a disk file incorporating the gimbal suspension of the present invention. Recording disks 71 are rotated by a motor (not shown). The suspension assembly 10 is mounted to an actuator 73, which is driven by an actuator motor, such as a voice coil motor 72 to reposition the slider 40 over the disk. The rotation of the disk 71 generates an air stream which creates an air bearing between the slider and the disk, lifting the slider away from the disk. To counter the air lift pressure exerted on the slider, a predetermined load is applied through a load point on the suspension to a precise load point on the slider. The slider flies above the disk at a height established by the equilibrium of the load on the load point and the lift force of the air bearing, which air bearing is controlled by the attitude of the slider with respect to the disk. As described, the formed tongue of the present invention corrects or eliminates PSA and provides an accurate attitude of the slider with respect to the disk.

While the preferred embodiments of the present invention have been illustrated in detail, it should be apparent that modifications and adaptations to those embodiments may occur to one skilled in the art without departing from the scope of the present invention as set forth in the following claims.

We claim:

1. In a gimbal suspension assembly for supporting a slider configured for a disk drive, said suspension having a load beam, a flexure member at the distal end of said load beam comprising:

a generally planar flexure section having electrical leads formed on a surface thereof, for electrical connection to said slider;

a tongue; and three extension members, each connecting a separate side of said tongue to said generally planar flexure section, extending said tongue from said generally planar flexure section and forming said tongue positioned in a second plane displaced from the plane of said generally planar flexure section, for attaching said slider to said tongue displaced from said generally planar flexure section, said tongue formed so that said second plane is displaced in the direction of said electrical lead surface to thereby facilitate said electrical connection.

2. The flexure member of claim 1, wherein:

said generally planar flexure section additionally comprises a dielectric layer disposed on said surface separating said electrical leads from said surface; and said tongue is formed so that said second plane is displaced a distance at least equal to the thickness of said dielectric layer.

3. The flexure member of claim 2 wherein:

said generally planar flexure section electrical leads comprise an etched conductive layer disposed on said dielectric layer.

4. The flexure member of claim 2, wherein:

the surface of said tongue facing in the direction of said displacement and away from said generally planar flexure section comprises a bonding surface for bonding said slider thereto.

5. The flexure member of claim 2, wherein:

said generally planar flexure section electrical leads extend from said dielectric layer and are bent in the direction of said tongue displacement for contacting an edge of said slider.

6. The flexure member of claim 5, wherein:

said bent electrical leads extend beyond said tongue by a distance sufficient to provide a surface towards said slider when said slider is positioned on said tongue to be bonded to said slider by ultrasonic bonding.

7. The flexure member of claim 5, wherein:

said tongue is formed so that said second plane is displaced a distance at least equal to the thickness of said dielectric layer and said conductive layer.

8. The flexure member of claim 2, wherein:

said general planar flexure section dielectric layer extends toward said tongue beyond said electrical leads to provide an insulative platform for reflow or conductive ball bonding said electrical leads to said slider.

9. The flexure member of claim 8, wherein:

said tongue is formed so that said second plane is displaced a distance at least equal to the thickness of said dielectric layer, whereby said dielectric layer insulative platform extends toward said tongue at a level approximately equal to the level of said second plane for supporting conductive balls for bonding said electrical leads to said slider.

10. The flexure member of claim 2, wherein:

said general planar flexure section additionally comprises gimbal legs extending on either side of said tongue to said extension members.

11. A slider flexure for attachment to a disk drive, comprising:

a slider;

a generally planar flexure section having electrical leads formed on a surface thereof, for electrical connection to said slider;

a tongue; and three extension members, each connecting a separate side of said tongue to said generally planar flexure section, extending said tongue from said generally planar flexure section and forming said tongue positioned in a second plane generally parallel to, but displaced from, the plane of said generally planar flexure section, supporting said slider displaced from said generally planar flexure section, said tongue formed so that said second plane is displaced in the direction of said electrical lead surface to thereby facilitate said electrical connection.

12. The slider flexure of claim 11, wherein:

said generally planar flexure section additionally comprises a dielectric layer disposed on said surface separating said electrical leads from said surface; and said tongue is formed so that said second plane is displaced a distance at least equal to the thickness of said dielectric layer.

13. The slider flexure of claim 12, wherein:

said generally planar flexure section electrical leads comprise an etched conductive layer disposed on said dielectric layer.

14. The slider flexure of claim 12, wherein:

said slider is bonded to the surface of said tongue facing in the direction of said displacement and away from said generally planar flexure section.

15. The slider flexure of claim 14, wherein:

said generally planar flexure section electrical leads extend from said dielectric layer and are bent in the direction of said tongue displacement for contacting an edge of said slider.

16. The slider flexure of claim 15, wherein:

said bent electrical leads extend beyond said tongue by a distance sufficient to provide a bonding surface towards said slider, and are bonded to said slider by ultrasonic bonding.

17. The slider flexure of claim 15, wherein:

said tongue is formed so that said second plane is displaced a distance at least equal to the thickness of said dielectric layer and said conductive layer.

18. The slider flexure of claim 14, wherein:

said general planar flexure section dielectric layer extends toward said tongue beyond said electrical leads to provide an insulative platform for bonding said electrical leads to said slider.

19. The slider flexure of claim 18, wherein:

said tongue is formed so that said second plane is displaced a distance at least equal to the thickness of said dielectric layer, whereby said dielectric layer insulative platform extends toward said tongue at a level approximately equal to the level of said second plane;

and said slider is bonded to said electrical leads by conductive balls supported by said dielectric layer insulative platform.

20. The flexure member of claim 12, wherein:

said general planar flexure section additionally comprises gimbal legs extending on either side of said tongue to said extension members.

21. A magnetic disk drive comprising:

a disk having a magnetic recording surface;

a spindle motor for rotating said disk;

a magnetic transducer;

a slider supporting said magnetic transducer;

an actuator assembly;

a generally planar flexure section attached to said actuator assembly at a proximal end thereof having electrical leads formed on a surface thereof, for electrical connection to said magnetic transducer;

a tongue; and three extension members, each connecting a separate side of said tongue to said generally planar flexure section at a distal end of said generally planar flexure section, extending said tongue from said generally planar flexure section and forming said tongue positioned in a second plane generally parallel to, but displaced from, the plane of said generally planar flexure section, supporting said slider displaced from said generally planar flexure section, said tongue formed so that said second plane is displaced in the direction of said electrical lead surface to thereby facilitate said electrical connection, and the opposite side of said slider is in proximity to said magnetic recording surface, whereby said magnetic transducer is supported in close proximity to said magnetic recording surface of said disk.

22. The magnetic disk drive of claim 21, wherein:

said generally planar flexure section additionally comprises a dielectric layer disposed on said surface separating said electrical leads from said surface; and said tongue is formed so that said second plane is displaced a distance at least equal to the thickness of said dielectric layer and said electrical leads.

23. The magnetic disk drive of claim 22, wherein:

said generally planar flexure section electrical leads comprise an etched conductive layer disposed on said dielectric layer.

24. The magnetic disk drive of claim 22, wherein:

said general planar flexure section additionally comprises gimbal legs extending on either side of said tongue to said extension members;

said slider is bonded to the surface of said tongue facing in the direction of said displacement and away from said generally planar flexure section; and said actuator assembly additionally comprises a gimbal pivot positioned against the other surface of said tongue and centered with respect to said slider, whereby said slider and said tongue are free to pivot about said gimbal pivot to maintain an appropriate attitude with respect to said magnetic recording surface.

25. The magnetic disk drive of claim 24, wherein:

said generally planar flexure section electrical leads extend from said dielectric layer and are bent in the direction of said tongue displacement for contacting an edge of said slider for electrical connection to said magnetic transducer.

26. The magnetic disk drive of claim 25, wherein:

said bent electrical leads extend beyond said tongue by a distance sufficient to provide a bonding surface towards said slider, and are bonded to said magnetic transducer by ultrasonic bonding.

27. The magnetic disk drive of claim 25, wherein:

said tongue is formed so that said second plane is displaced a distance at least equal to the thickness of said dielectric layer.

28. The magnetic disk drive of claim 24, wherein:

said general planar flexure section dielectric layer extends toward said tongue beyond said electrical leads to provide an insulative platform for bonding said electrical leads to said magnetic transducer.

29. The magnetic disk drive of claim 28, wherein:

said tongue is formed so that said second plane is displaced a distance at least equal to the thickness of said dielectric layer, whereby said dielectric layer insulative platform extends toward said tongue at a level approximately equal to the level of said second plane;

and said magnetic transducer is bonded to said electrical leads by conductive balls supported by said dielectric layer insulative platform.

30. A method for manufacturing a gimbal suspension flexure member configured for supporting a slider for a disk drive, comprising the steps of:

providing a generally planar flexure member having a flexure section;

forming electrical leads on a surface of said flexure section, for electrical connection to said slider;

forming a tongue; and forming three extension members to extend said tongue from said flexure section, each said extension member connecting a separate side of said tongue to said flexure section to position said tongue in a second plane generally parallel to, but displaced from, the plane of said flexure section, for attaching said slider to said tongue displaced from said generally planar flexure section, and position said tongue so that said second plane is displaced in the direction of said electrical lead surface to thereby facilitate said electrical connection.

31. The method for manufacturing of claim 30, wherein:

said providing step additionally comprises providing a dielectric layer disposed on said flexure section surface separating said electrical leads from said surface; and said forming step comprises forming said tongue so that said second plane is displaced a distance at least equal to the thickness of said dielectric layer and said electrical leads.

32. The method for manufacturing of claim 30, wherein:

said providing step additionally comprises providing a dielectric layer disposed on said flexure section surface and a conductive layer disposed on said dielectric layer, and etching said conductive layer to form electrical leads disposed on said dielectric layer.

33. The method for manufacturing of claim 30, additionally comprising the step of:

bonding said slider to the surface of said tongue facing in the direction of said displacement and away from said generally planar flexure section.

34. The method for manufacturing of claim 33, wherein:

said providing step additionally comprises providing extended said flexure section electrical leads so that said electrical leads extend from said dielectric layer; and comprising the additional step of bending said extended electrical leads in the direction of said tongue displacement for contacting an edge of said slider.

35. The method for manufacturing of claim 34, wherein said slider comprises a transducer thereon, and said method comprises:

said bending step comprises bending said extended electrical leads beyond said tongue by a distance sufficient to provide a surface towards said slider when said slider is positioned on said tongue to be bonded; and comprising the additional step of bonding said bent electrical leads to said transducer by ultrasonic bonding.

36. The method for manufacturing of claim 34, wherein:

said forming step forms said tongue so that said second plane is displaced a distance at least equal to the thickness of said dielectric layer and said conductive layer.

37. The method for manufacturing of claim 33, wherein said slider comprises a transducer thereon, and said method comprises:

said providing step additionally comprises providing extended said flexure section dielectric layer so that said dielectric layer extends toward said tongue beyond said electrical leads to provide an insulative platform; and comprising the additional step of employing conductive balls on said insulative platform and bonding said electrical leads to said transducer with said conductive balls.

38. The method for manufacturing of claim 37, wherein:

said forming step additionally comprises forming said tongue so that said second plane is displaced a distance at least equal to the thickness of said dielectric layer, whereby said dielectric layer insulative platform extends toward said tongue at a level approximately equal to the level of said second plane for supporting said conductive balls for said bonding step.

39. The method for manufacturing of claim 33, wherein:

said providing step additionally comprises providing gimbal legs from said flexure section extending on either side of said tongue to said extension members.

* * * * *